March 26, 1968 R. J. HENNELLS 3,375,001
HYDROPNEUMATIC SPRING
Filed May 4, 1966
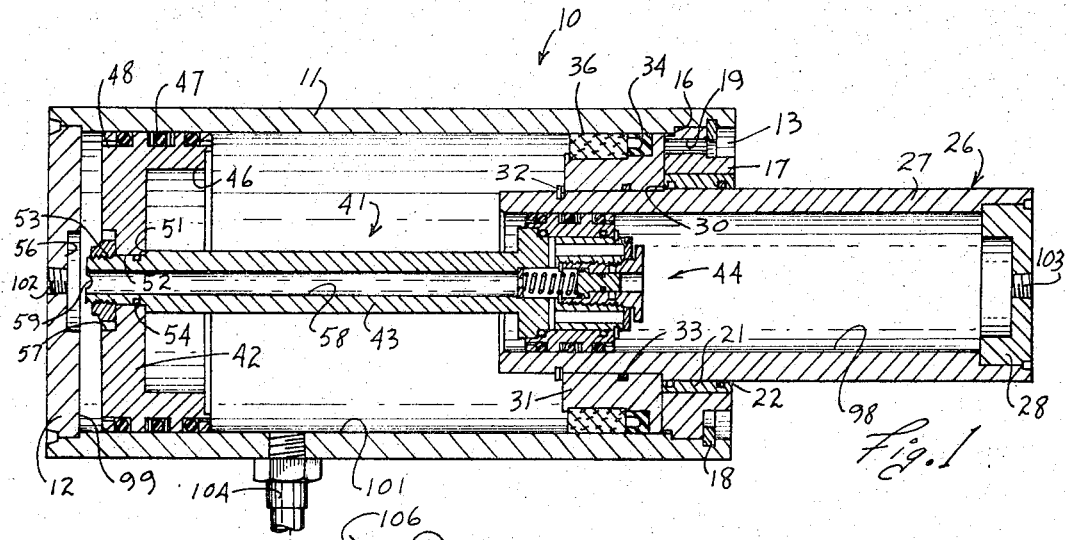
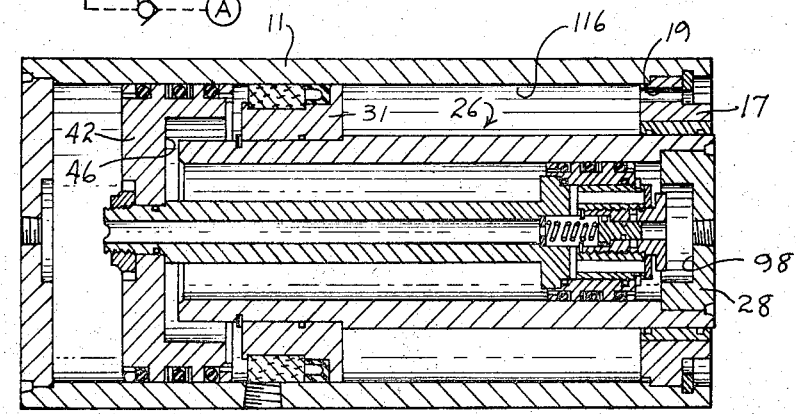
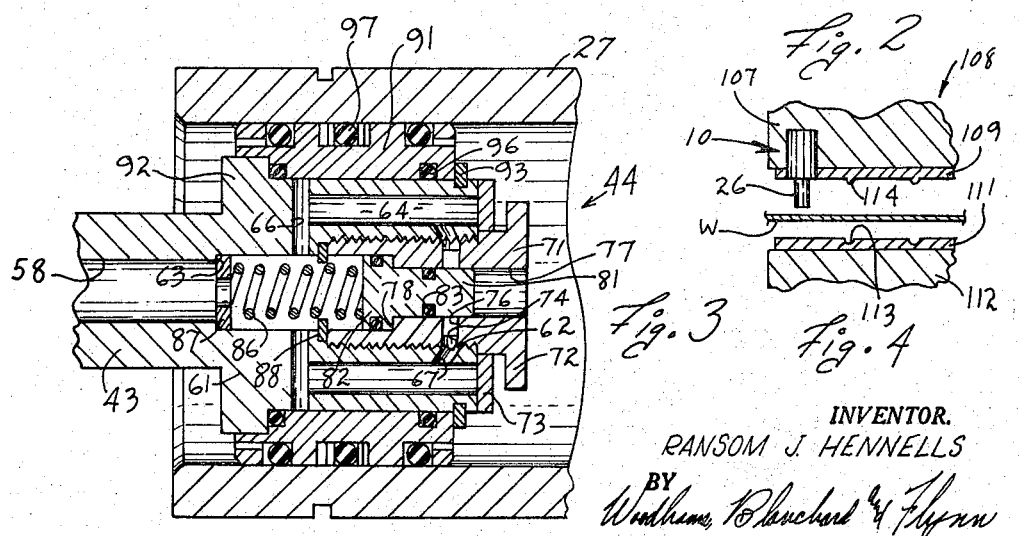
INVENTOR.
RANSOM J. HENNELLS
BY
Woodhams, Blanchard & Flynn
ATTORNEYS

United States Patent Office 3,375,001
Patented Mar. 26, 1968

3,375,001
HYDROPNEUMATIC SPRING
Ransom J. Hennells, Plymouth, Mich., assignor to W. E. Hennells Company, Inc., Belleville, Mich., a corporation of Michigan
Filed May 4, 1966, Ser. No. 547,547
10 Claims. (Cl. 267—1)

This invention relates to a die spring, and more particularly relates to a hydropneumatic spring for engaging and holding a workpiece in a stamping press.

It has been found in the past that a piece of sheet metal, in a stamping press, unless held, may shift as the press platents are brought closer together prior to the actual stamping operation. It has further been found that the piece of sheet metal often tends to shift as a whole or in part from a desired position during actual stamping operation as the stamping dies are brought into contact therewith and deformation takes place. Thus, if accurate stamping is to result, the piece of sheet metal must be held against lateral shifting both before and during the stamping operation.

Generally speaking, a moderate holding force would be satisfactory for preventing displacement of the sheet metal piece during the initial movement of the press platens toward each other and prior to actual stamping. On the other hand, during actual deformation of the sheet metal, the force required to hold the sheet metal laterally immovable increases and eventually may greatly exceed the holding force required before deformation.

Thus, the spring of the present invention was particularly developed to provide an increasing holding force of this type so that a plurality of such springs, distributed in spaced locations opposite the workpiece, on one of the press platens will, as the press platens move together, develop the required holding force tailored in magnitude to the changing requirements of the progressing stamping operation.

It will be noted that in the above use, the restoring force of the spring is to be largely a function of the relative positions of the platens. Thus, it is desirable that the spring force be largely independent of the velocity with which the press platens move together, which may differ from press to press, or which may change with the rate at which force is supplied to the press.

Hydropneumatic springs used in stamping presses may be called upon to absorb considerable energy which gives rise to considerable heating within the spring. Thus, particularly when the press is recycled at a rapid rate over a long period of time, considerable heat must be dissipated by the spring to maintain the temperature of the hydraulic fluid therein within acceptable limits. Therefore, unless capable of properly dissipating heat, the die spring may become unuseable during rapid cycling of the press.

Accordingly, an object of this invention is to provide a compressible die spring which requires a moderately high compressive force thereupon to initiate compression thereof and which requires a uniformly increasing compressive force to effect further and uniform compression thereof.

A further object of this invention is to provide a die spring, as aforesaid, particularly adapted for holding a metal sheet in a stamping press as the press platens move together and as the stamping dies engage and deform the sheet, and in which the force exerted by the die spring on the workpiece, before and during deformation of such workpiece, can be made to correspond closely to and exceed the force required to prevent shifting of the workpiece.

A further object of this invention is to provide a die spring, as aforesaid, particularly capable of generating high magnitude holding forces on a workpiece during deformation of such workpiece and substantially increasing such holding force during such deformation as a result of a relatively short contraction thereof.

A further object of this invention is to provide a die spring, as aforesaid, constructed to allow relatively rapid dissipation of heat therefrom, in which the temperature of the hydraulic fluid is maintained at a relatively low temperature at any given rate of cycling of the spring, and in which the major hydraulic fluid chambers, in which the hydraulic fluid is stored when the spring is fully extended or fully detracted, are largely bounded by exterior walls of the die spring, so as to allow heat in such chambers to dissipate directly through such walls.

A further object of this invention is to provide a die spring, as aforesaid, including a pneumatic fluid chamber, in which the pneumatic fluid chamber is bounded by exterior walls of the die spring to allow direct and relatively rapid dissipation of the heat in the pneumatic fluid through such bounding walls.

A further object of this invention is to provide a die spring, as aforesaid, in which the force required to initiate pressure of the spring is primarily a function of the hydraulic portion of the spring and in which the additional force required to further compress the die spring is primarily but not exclusively a function of the pneumatic portion of the die spring.

A further object of this invention is to provide a die spring, as aforesaid, in which the hydraulic fluid is shifted during compression of die spring in a manner to add to the pneumaitc fluid pressure and hence, add to the increase of the force exerted by the spring as it is being compressed.

A further object of this invention is to provide a die spring, as aforesaid, which is readily manufacturable with conventional materials and tools and with conventional tolerances, which has relatively few major parts, in which the major parts are relatively simple in construction, and which is readily adapted for production in either large or small lots.

A further object of this invention is to provide a die spring, as aforesaid, which is of sturdy construction and capable of a long and relatively trouble-free life with little or no maintenance, which is readily maintainable by persons acquainted with hydropneumatic die springs in general and which is readily disassembled for inspection or repair in relatively short time.

Other objects and purposes of this invention will be apparent to persons acquainted with apparatus of this general type upon reading the following description and inspecting the accompanying drawings.

In the drawings:

FIGURE 1 is a central cross-sectional view of the die spring embodying the invention in its fully extended condition.

FIGURE 2 is similar to FIGURE 1 but with the die spring in a compressed condition.

FIGURE 3 is an enlarged fragment of FIGURE 1 disclosing the construction of the hydraulic control valving.

FIGURE 4 is a central cross-sectional view of reduced scale disclosing a portion of a stamping press including the die spring of FIGURE 1.

Certain terminology will be used in the following description for convenience in reference only and will not be limiting. The word "upwardly," "downwardly," "rightwardly," and "leftwardly" will designate directions in the drawings to which reference is made. The words "inwardly" and "outwardly" will refer to directions toward and away from the geometric center of the device and the designated parts thereof. Said terminology will include

General description

The objects and purposes of this invention are met by providing a die spring comprising a hollow casing closed at one end thereof. A cup-shaped, inwardly opening plunger has one end axially slideably received in the open end of the casing. An axially shiftable intermediate member has a radially enlarged piston on one end thereof, snugly but slideably received in the casing and a valve head snugly but slideably received within the plunger, said piston and valve head being connected by a hollow, rigid and elongated rod. The valve head is provided with valve means responsive to a substantial pressure drop from the plunger to the passage within the hollow rod for opening and allowing fluid flow therethrough. The valve head further includes a return valve which opens to allow communication between the rod passage and the plunger at a relatively low pressure drop from the rod passage to the plunger. The interior of the plunger between the closed end thereof and the valve head thus comprises a hydraulic chamber the contents thereof being maintained at a high pressure during compression of the die spring. The interior of the casing between the closed end thereof and the piston comprises a further hydraulic chamber which is maintained at a substantially lower pressure during compression of the die spring. The area within the casing and between the piston and valve head comprises a pneumatic chamber, the length and, hence, the volume of which is substantially reduced during compression of the die spring by movement of the piston and plunger toward each other for furnishing an increasing outward pressure on the plunger.

Detailed description

Turning now to the drawings, and more particularly to FIGURES 1 and 2 thereof, the die spring 10 comprises a hollow cylindrical casing 11 closed at one end by a radial wall 12, the remaining end 13 thereof being open. The open end 13 of the casing 11 is relieved to provide an axially outwardly facing shoulder 16 therewithin. An annular stop 17 fits snugly within the open end 13 and abuts the shoulder 16 therewithin. A snap ring 18 fixedly secures the annular stop 17 within the open end 13 of the casing 11. An axial vent 19 is provided through the annular stop 17 between the interior of the casing 11 and the atmosphere for purposes appearing hereinafter. An annular bushing 21 of a suitable low-friction material, such as brass, is fixed by any convenient means, such as a press fit, within the annular stop 17. The bushing is provided with axially spaced and inwardly opening grooves in which are snugly received suitable sealing means, here O-rings 22.

A generally cup-shaped, hollow and cylindrical plunger 26 extends slideably but snugly through the bushing 21 in coaxial alignment with the casing 11, the O-rings 22 providing a seal between the bushing 21 and the peripheral wall 27 of the plunger 26 to prevent fluid flow axially therebetween. An end wall 28 closes the rightward or outer end of the plunger 26.

The leftward end of plunger 26 has a rightwardly facing shoulder 30 defined by a radial reduction of the peripheral wall 27. An annular seal carrier 31 is snugly telescoped over the reduced diameter portion of the peripheral wall 27 and abuts the shoulder 30. The seal carrier 31 is held snugly against the shoulder 30 by a snap ring 32 carried by the plunger 26. The seal carrier 31 is internally grooved to take an O-ring 33 which bears on the peripheral wall 27 to prevent axial fluid leakage therealong. The seal carrier 31 is snugly but slideably disposed within the casing 11 between the wall 12 and the annular stop 17. The leftward end of the seal carrier is of reduced diameter and is snugly surrounded by a conventional C-shaped annular seal 34, preferably of neoprene or the like. Conventional packing 36 surrounds the seal carrier 31 to the left of the seal 34, the seal 34 and packing 36 snugly but slideably engaging the interior of the casing 11 to prevent fluid leakage therepast.

An intermediate member 41 is disposed within the casing 11 and comprises a radially extended piston 42 snugly but slideably disposed within the casing 11, an elongated hollow rod 43 extending coaxially rightwardly from the piston 42 and a valve head 44 carried by the rightward end of the rod 43 coaxially therewith, said valve head being snugly but slideably disposed within the plunger 26. The rightward end of the piston 42 has a radially enlarged recess 46 adapted to loosely receive the leftward end of plunger 26 when the die spring 10 is in its collapsed or contracted state of FIGURE 2. A plurality of O-rings 47 or other suitable seals are disposed in annular grooves axially spaced along the periphery of the piston 42 for sealing engagement against the interior walls of the casing 11. In the particular embodiment shown, the pressure appearing on the inner and outer surfaces of the O-rings is equalized by providing bleed passages 48 from the adjacent exterior surface of the piston to the bottom of the O-ring grooves.

The leftward end of the rod 43 is reduced in exterior diameter to form a leftwardly facing shoulder 51. The reduced end of the rod 41 is snugly received through a central opening 52 in the piston 42 and a nut 53 is threadably disposed on the leftward end of the rod 43 and snugly pulls the piston 42 against the shoulder 51 on said rod. A suitable seal, here an O-ring 54 is carried in a groove on the leftward end of the rod 43 between the nut 53 and the shoulder 51 for preventing fluid leakage between the rod and the piston. In the particular embodiment shown, both the wall 12 and the leftward face of the piston 42 are recessed at 56 and 57, respectively, for receiving portions of the nut 53 therein, so as to allow the piston 42 to move relatively close to the wall 12 without interference of the leftward rod end or nut with said wall.

The rod 43 has a central passage 58 which extends the length thereof. In the particular embodiment shown, the leftward end of the rod 43 is provided with transverse grooves, one of which is indicated at 59, opening into the central passage 58, which allow free fluid flow between the passage 58 and the area between the wall 12 and piston 42 when the leftward end of the rod 43 is relatively close to the wall 12.

The valve head 44 (FIGURE 3) comprises a body portion 61 which extends coaxially rightwardly from the rod 43 and is preferably integral therewith. The body portion 61 has a rightwardly opening, internally threaded recess 62 which is coaxial with and communicates with the rightward end of the central passage 58 of the rod 43. The central passage 58 is preferably somewhat enlarged between the leftward end of the body portion 61 and the threaded recess 62 to form a rightwardly facing shoulder 63. At least one pair of diametrically opposed axially aligned passages 64 are spaced outwardly of the threaded recess 62 and extend from a point just to the left of the end of the threaded recess 62 rightwardly through the rightward end face of the body portion 61. A radial passage 66 extends through the body portion 61 at the leftward end of each of the axial passages 64 for connecting same to the central passage 58. A hole 67 extends between each of the passages 64, near the rightward end thereof, and the threaded recess 62, the holes 67 preferably being angled leftwardly and outwardly, to facilitate drilling thereof.

A plug 71 is externally threaded for threaded reception in the recess 62. The rightward end of the plug 71 is provided with a radially extended flange 72, which is axially spaced a short distance to the right of the end of the body portion 61. The plug 71 between the flange 72 and the body portion 61, is spaced radially inwardly from the axial passages 64. The flange 72, on the other hand, is axially opposed with the axial passages 64. An annular sealing washer 73 is slideably disposed upon the plug 71 between the body portion 61 and the flange 72. The washer 73 overlaps the rightward ends of the axial passages 64 and is adapted to rest snugly against the rightward end of the body portion 61 in response to a pressure drop from right to left thereacross in order to prevent leftward flow therepast from the interior of the plunger 26 into the axial passages 64.

The threaded portion of the plug 71 is provided with an annular groove 74, which communicates with the holes 67 in the body portion 61. The annular groove 74 communicates through radiantly inwardly extending holes 76 with a central opening 77 which extends through the plug 71. The rightward portion of the central opening 77 is of lesser diameter than that of the portion of central passage 58 to the right of the shoulder 63, whereas the leftward end of the central opening 77 is preferably equal in diameter to the portion of the central passage 58 to the right of the shoulder 63, the leftward and rightward portions of the central opening 77 thus being separated by a step 78.

A valve core 81 is snugly but slideably disposed in the rightward, small diameter portion of the central opening 77 and has a radial flange 82 on the leftward end thereof. The flange 82 is snugly but slideably disposed in the enlarged diameter leftward portion of the central opening 77. An O-ring 83 is provided in an annular groove in the rightward portion of the core 81 and in a further groove in the flange 82 for sealing against the peripheral walls of the smaller and larger portions, respectively, of the central opening 77. The rightward end of the valve core 81, when at rest, covers the hole 76 thereby preventing fluid flow from the rightward end of the valve head 44 to the central passage 58 in the rod 43. The valve core 81 is urged to remain in its rightwardmost position shown in FIGURE 3 by a coil compression spring 86. The spring 86 is disposed in the opening 58 to the left of the core 81 and is backed by a hollow washer 87 which rests against the shoulder 63. A snap ring 88 is preferably provided at the leftward end of the plug 71 and extends into the path of the core 81 to limit leftward movement thereof so that the smaller one of the O-rings 83 does not move leftwardly past the shoulder 78.

An annular surround 91 is telescoped over the body portion 61 of the valve head and is snugly but slideably received within the peripheral wall 27 of the plunger 26. The periphery of the body portion 61 is provided with a short radial flange 92 at the leftward end thereof and a radially extending snap ring 93 adjacent the right end thereof, the surround being snugly axially disposed between said flange and snap ring and thereby rigidly fixed to the body portion 61. The flange 92 is spaced leftwardly a short distance from the hole 66 in the body portion 61. The surround 91 is internally grooved for accepting a pair of annular seals, preferably O-rings 96, said O-rings being disposed on axially opposite sides of the holes 66 for preventing leakage of fluid from the holes 66 along the interface of the surround 91 and body portion 61. The periphery of the surround 91 is annularly grooved for receiving a plurality, here three, of annular seals, preferably O-rings 97, which are in sealing engagement with the interior surface of the peripheral wall 27 for preventing pressure fluid flow past the valve head 44 along its periphery. The grooves of O-rings 97 are preferably vented as above discussed with respect to the O-rings 47 of the piston 46 to equalize the pressure on the inner and outer surfaces thereof.

The interior portion of the plunger 26 (FIGURE 1) to the right of the valve head 44 constitutes a hydraulic fluid chamber 98. The hydraulic chamber 98, during compression of the die spring 10, is under a relatively high pressure determined by the pressure required to leftwardly displace and thus open the valve core 81 for allowing communication between the hydraulic chamber 98 and central passage 58 of the rod 43. The interior portion of the casing 11 between the piston 42 and end wall 12 comprises a further hydraulic chamber 99. The interior of the casing 11 between the piston 42 and the leftward faces of the plunger 26 and valve head 44 comprises a pneumatic chamber 101. The hydraulic chambers 98 and 99, the central passage 58 and the passages within the valve head 44 are normally filled with hydraulic fluid, for example, oil. Plugs 102 and 103, respectively disposed in the walls 12 and 28, are readily removable for draining or replenishing the supply of hydraulic fluid. The pneumatic pressure in the pneumatic chamber 101 is preferably maintained at least at a preselected minimum value somewhat above atmospheric pressure. In the particular embodiment shown, this is done by means of a fitting 104 communicating with the pneumatic chamber intermediate the ends thereof and in turn connected to a source A of pneumatic fluid, preferably air under pressure through a check valve 106. The check valve 106 freely admits air to the pneumatic chamber 101, but prevents such air from returning from the chamber 101.

*Operation*

Although other uses are contemplated, the die spring 10 embodying the invention is particularly intended for holding the workpiece in a stamping press as shown in FIGURE 4 in which the die spring 10 is carried by one platen 107 of a stamping press 108. Although it is preferred that a plurality of die springs 10 be utilized for holding the workpiece W at spaced locations thereon, a discussion of the operation of one thereof is believed sufficient to illustrate the present invention.

In the particular embodiment shown, the casing 11 is recessed within the upper platen 107 and the plunger 26 extends downwardly beyond a die 109 carried by the upper platen 107. The upper die 109 and plunger 26 are spaced above a corresponding lower die 111, in turn carried upon the lower platen 112 of the press. A workpiece W of sheet metal is positioned between the stamping dies 109 and 111. As the upper platen 107 is lowered, the plunger 26 comes into contact with the workpiece W and urges the same against the surface of the lower die 111. Further downward urging of the upper platen 107 tends to compress the die spring 10. As the downward force of the upper platen increases the hydraulic fluid pressure within the rightward hydraulic chamber 98 increases correspondingly and, through the intermediate member 41, results in a corresponding although substantially lesser rise in pressure in the leftward hydraulic chamber 99. However, as long as the compressive force exerted on the die spring remains below a preselected value, contraction of the die spring will not take place since the valve head will remain closed to the pressure fluid flow therethrough. The resulting right to left (FIGURES 1–3) pressure drop, as a result of the small travel to diameter ratio of the washer 73 moves the sealing washer 73 even against gravity into its closed leftwardmost position shown and maintains same closed for blocking the ends of the exit passages 64. The core 81 will remain in its closed position shown as long as the force of the spring 86 and the rightward hydraulic pressure on the core 81 exceed the leftward force on the core 81 resulting from the pressure in the high pressure hydraulic chamber 98.

When the force urging the upper platen 107 downwardly reaches said preselected value, the core 81 will be displaced leftwardly by the hydraulic pressure in the chamber 98 past the holes 76 thereby allowing hydraulic fluid flow from chamber 98 through the holes 67, axial passage 64, radial holes 66 and central passage 58 to the low pressure hydraulic chamber 99. The resulting drain of oil from the plunger 26 allows the plunger to move into the casing 11 which in turn allows the upper platen 107 to move downwardly toward the lower platen and workpiece. Thus, die spring 10 is in firm contact with the workpiece for holding same in place and for preventing lateral shifting thereof on the lower die. Once firm contact has been established between the plunger 26 and workpiece W, the upper die contacts the workpiece and deformation of the workpiece begins, such deformation being due to corresponding depressions 113 and projections 114 in dies 109 and 111, Once contraction of the die spring has begun, the flow of fluid from the chamber 98 to the chamber 99 enlarges the chamber 99 by pushing the piston 42 rightwardly. This in turn reduces the volume of the pneumatic chamber 101 and thus increases the pressure of the air therewithin. Further, the inward movement of the plunger 26 acts directly through the leftward end thereof and of the seal carrier to further reduce the volume of the pneumatic chamber 101 and thereby further increase the pressure of the air therewithin. The reduction in volume of the pneumatic chamber 101 and, hence, the increase of air pressure therein results mostly from the leftward movement of the plunger and seal carrier thereinto and is only fractionally due to the rightward movement of the piston, the rightward movement of the piston being but a fraction of the leftward movement of the plunger. The pressure of the air in chamber 101 increases uniformly as a result of the contraction of the die spring 10, or more particularly as a positive, practically linear, function of the entrance of the plunger thereinto. The increasing pressure of the air in the chamber 101 acts directly upon the leftward end of the plunger 26 and seal carrier 31 to deter leftward movement thereof, the deterrent force rising as the plunger moves further into the pneumatic chamber 101.

The rising pneumatic pressure in the chamber 101 also tends to urge the intermediate member 41 leftwardly, as a result of the differential in area between the piston and valve head, and so requires an increased hydraulic pressure in the chamber 99 to prevent such rightward movement. This increased pressure in the chamber 99 is passed by the central passage 58 to the enlarged leftward end of the valve core 81 and increases the closing force on such core. This in turn requires an increased hydraulic pressure in the chamber 98 to maintain the core 81 in its leftwardmost open position. Thus, as a result of the direct resistance of the air in chamber 101 to compression acting on the plunger and seal carrier and in addition due to the indirect effect of air pressure acting on the piston and valve core 81, as above described, the compressive force exerted upon the die spring must increase beyond said preselected value required to initially compress the extended die spring if the die spring is to continue its contraction.

During contraction of the die spring 10, the vent 19 allows ambient air to enter the annular zone 116 (FIGURE 2) between the stop 17 and the carrier 31. Thus, movement of the plunger is not curbed by gas pressures in the zone 116 as would be the case where such zone is closed.

The rising oil pressure in chamber 99 and in central passage 58 resulting from contraction of the die spring 10 increases the rightward force on the valve core 81 at a rate substantially greater than would be the case if the leftward end area of the valve core were the same as the rightward end area thereof. Should the press platens stop moving with the die spring 10 partially compressed, the valve core will close rapidly and with little drop in pressure in hydraulic chamber 98. Consequently, the die spring 10 will continue to exert substantially the same holding force on the workpiece as before the press stopped closing.

Thus, in summary, as the spring 10 is compressed, the force required to compress it must rise uniformly from the preselected initial value, one portion of the spring's resistance originating in the compression of the air and its direct action on the plunger and the other portion of the increase resulting from the increased force required to maintain the valve core 81 open.

In the particular embodiment shown, the spring stops contracting when the plunger 26 is fully retracted into the casing 111, further movement being prevented by interference of the lower die part with the end of the casing 111.

Should the upper die part thereafter be raised, the compressive force on the spring is eliminated and the valve 81, if not already closed, will close in response to stabilization of the hydraulic pressures thereacross at a value such that the rightward hydraulic force thereon plus the force of the spring equals the leftward hydraulic force thereon. Air pressure in the chamber 101, upon release of the compressive force on the spring, tends to directly urge the plunger 26 outwardly of the casing 11 and at the same time tends to urge the piston 42 leftwardly toward the wall 12. As a result, the valve head moves leftwardly as the plunger moves rightwardly so that the hydraulic chamber 98 expands in volume. With the beginning of such an expansion, the pressure within the hydraulic chamber 98 falls below that in the leftward chamber 99 and as a result of the leftward to rightward pressure drop across the washer 73, the latter is urged rightwardly away from the rightward ends of the axial passages 64 in the valve head. As a result, hydraulic fluid from the passage 58 flows past the spring 86, through the radial holes 66 and axial passages 64, outwardly into the rightward chamber 98 past the rightwardly displaced washer 73. Thus, the hydraulic pressure of the leftward and rightward hydraulic chambers is equalized. The pressure in the chamber 101 is preferably sufficient to force the plunger 26 to its rightwardmost position, shown in FIGURE 1, whereat it abuts the stop 17. The volume of hydraulic fluid in the die spring 10 then determines the rest position of the intermediate member 41 which is here spaced closely from the wall 12. The rightward movement of the plunger 26 causes air trapped in the zone 116 to flow freely out of the vent 19 and, hence, there is no back pressure in the zone 116 to interfere with rightward movement of the plunger.

If desired, a relatively light spring may be provided to urge the washer 73 against the ends of the passages 64, particularly if it is desired to use the die spring 10 in a position with the plunger 26 thereof downwardly extended as shown in FIGURE 4. On the other hand, depending on a variety of factors, including the viscosity of the hydraulic fluid used and the travel of the washer 73 from the ends of the passages 64, such a spring may not be required. More particularly, hydraulic fluid flow leftwardly into passages 64 creates a leftward drag on the washer which can be made sufficient to move the washer into sealing contact with the ends of the openings 64. Thereafter, the pressure drop from the chamber 98 to the leftward side of the washer 73 will tend to hold same firmly in place.

Compression of the die springs 10 results in heating of the hydraulic fluid therein as well as of the air in the pneumatic chamber 101. The die spring 10 is arranged to efficiently dissipate such heat so as to maintain the temperature thereof within acceptable limits. Referring to FIGURE 1, it will be noted that the majority of walls bounding the chamber 98 are outside the die spring 10 when the die spring is fully expanded. As a result, heat generated in the hydraulic fluid in the chamber 98 before the core 81 opens will dissipate readily to the atmosphere through the peripheral wall 27 and outer wall 28 of the plunger 26.

On the other hand, when the die spring is fully compressed (FIGURE 2), the plunger 26 is substantially fully received within the casing 11. However, the end wall 28 of the plunger is still fully exposed such being normally in contact with the workpiece W and capable of dissipating heat by conduction thereto. Moreover, in its fully contracted condition, the volume of the chamber 98 is dastically reduced, sufficiently so that the ratio of exposed surface area of the chamber 98 to the volume of the chamber 98 is larger than when the die spring is fully expanded as in FIGURE 1. Thus, since the heat content of the hydraulic fluid will be a function of its volume and the rate of heat dissipation from the chamber 98 will be at least partially a function of the surface thereof exposed to the outside of the die spring, it will be seen that the heat of the oil in the chamber 98 will be readily dissipated even with the die spring 10 in its fully contracted condition.

Since only the rightward end of the low pressure chamber 99 faces toward the interior of the die spring 10 and the periphery and leftward end thereof are bounded by outside walls of the die spring, cooling of the low pressure hydraulic chamber 99 will also be relatively efficient.

The pneumatic chamber 101 also remains relatively cool. When expanded, as in FIGURE 1, the majority of the peripheral wall area thereof is exposed to the outside of the die spring. With the die spring in its contracted condition, the portion of the peripheral wall of the casing 11 bounding the pneumatic chamber 101 is substantially reduced. However, a large proportion of the air in the chamber 101 now lies within the leftward end of the plunger 26, more than half of which is exposed to the zone 116 between the stop 17 and the seal carrier 31 which during contraction of the die spring, if filled with ambient air through the vent 19 thereby allowing transfer of substantial heat through the peripheral wall of the plunger 26 from the pneumatic chamber 101 to the ambient air in the zone 116. At the end of its cycle of operation and as it is being allowed to expand, the die spring 10 will be purged of the now heated air in the zone 116 as the seal carrier 31 moves back rightwardly toward the stop 17 thus getting rid of the heated air and making way for a fresh charge of relatively cool ambient air during the next compression period.

The hydraulic passages in the rod 43 and the valve head 44 are not directly exposed to ambient air or the outside of the die spring. However, the hydraulic fluid within such passages remains at a substantially lower pressure and, hence, at a lower temperature than the oil in the hydraulic chamber 98 during compression of the die spring. Moreover, the proportion of the hydraulic fluid which is lodged at any moment within the passages of the rod and valve head is very small and therefore, the heat to be dissipated therefrom is very small. Still further, the volume of oil in the rod 43 is substantially larger than that in the valve head and is cooled to some extent by the air in the pneumatic chamber 101. Since oil passage 58 is relatively small in diameter, a relatively large surface area per volume ratio is achieved for the rod 43 which, in turn, allows for a relatively efficient cooling of the oil within the rod given a temperature drop from the interior thereof to the chamber 101.

Although a particular preferred embodiment of the invention has been disclosed above for illustrative purposes, it will be understood that variations or modifications thereof which lie within the scope of the appended claims are fully contemplated.

The embodiments of this invention in which an exclusive property or privilege is claimed are defined as follows:

1. A hydropneumatic die spring, comprising the combination:
    an expandable first hydraulic chamber;
    means defining a passage of reduced diameter extending from said first hydraulic chamber;
    means defining a second expandable hydraulic chamber spaced along said passage from said first hydraulic chamber, said means defining said second hydraulic chamber being movable along said passage defining means toward said first hydraulic chamber for effecting contraction of said second hydraulic chamber and expansion of said first hydraulic chamber;
    valve means disposed along said passage responsive to a preselected pressure drop from said second hydraulic chamber to said first hydraulic chamber for connecting said hydraulic chambers to each other and responsive to a drop of lesser magnitude in the opposite direction for placing said hydraulic chambers in communication with each other; and
    means defining a pneumatic chamber surrounding said passage defining means and disposed between said first and second hydraulic chambers, said pneumatic chamber being arranged for contraction upon movement of said second hydraulic chamber defining means toward the first hydraulic chamber.

2. A die spring for anchoring the workpiece in a press capable of generating a substantial initial holding force and capable further of generating an increasing holding force as the press closes on the workpiece comprising the combination:
    a hollow casing having an opening through one end thereof;
    a hollow plunger having one end thereof reciprocably extending into said casing through said opening, said one end of said plunger being open;
    an intermediate member disposed slideably in said casing, said intermediate member having a portion disposed in and slideable along said plunger, the other ends of said casing and said plunger being closed, the closed end of said casing and said intermediate member defining therebetween a first hydraulic chamber and the closed end of said plunger and said intermediate member portion defining therebetween a second hydraulic chamber within said plunger, said intermediate member and casing defining therebetween a closed pneumatic chamber;
    a passage through said intermediate member connecting said first and said second hydraulic chambers;
    valve means disposed along said passage for normally closing same, said valve means being responsive to a pressure drop from said second hydraulic chamber to said first hydraulic chamber for effecting communication therebetween and being responsive to a pressure drop of lesser magnitude in the opposite direction for effecting communication therebetween.

3. The device defined in claim 2 in which said intermediate member comprises radially extended piston snugly but slideably engageable with the periphery of the casing for isolating said first hydraulic chamber from said pneumatic chamber;
    and an elongated rod fixed and extending from said piston toward said intermediate member portion, said portion being rigidly affixed to the end of said rod spaced from said piston.

4. The device defined in claim 3 in which said passage extends along said rod between the ends thereof and in which said portion comprises a head carrying at least portions of said valve means.

5. The device defined in claim 2 in which said valve means comprises a first valve including resilient means for maintaining same closed against a preselected pressure drop from said second hydraulic chamber to said first hydraulic chamber and a second valve arranged to open in response to a relatively small pressure drop from said first hydraulic chamber to said second hydraulic chamber.

6. The device defined in claim 2 in which the periphery of said plunger is radially outwardly spaced from the periphery wall of said casing; and
    said plunger includes a radially enlarged portion adjacent the end thereof in snug sliding contact with the peripheral wall of said casing and including a vent through the casing adjacent the open end thereof for admitting ambient air into the zone between said radially extending portion of said plunger and the adjacent end of said casing in response to contraction of the plunger into the casing.

7. The device described in claim 2, in which said portion comprises valve head having a central opening therethrough, a valve core disposed in said central opening and resilient means for urging said valve core along said central opening toward said second hydraulic chamber, said central opening communicating between said first and second hydraulic chambers, said valve head further including at least one passage shunting said central opening and communicating therewith at a pair of spaced locations thereon, said valve core being resiliently urged to cover said shunting passage at said location closest to said second hydraulic chamber to normally prevent communication between said second hydraulic chamber and said shunting passage.

8. The device defined in claim 7 in which said central opening is enlarged at least along a portion thereof between said ends of said shunt passage, said enlarged portion being spaced from said one end of said shunt passage, said valve core having a radially extending flange disposed in said enlarged portion of said central opening and in snug sliding contact with the periphery thereof, whereby the end of said core facing said second hydraulic chamber is of lesser cross-sectional area than the end of said core facing toward said first hydraulic chamber so a given hydraulic pressure appearing on both ends of the core results in a net hydraulic force on the core toward said second hydraulic chamber to cover said one end of said passage.

9. The device defined in claim 7 in which said shunt passages open intermediate the ends thereof directly to said second hydraulic chamber and including an annular valve member opposed to the second chamber ends of said shunt passages responsive to a pressure drop from said second hydraulic chamber to said shunt passages for closing said shunt passages to direct communication with said second hydraulic chamber, said valve member being displaceable upon a pressure drop from said shunt passages to said second hydraulic chamber for allowing communication therebetween.

10. The device defined in claim 2 in which the major portion of the surface of said second hydraulic chamber is exposed outside the casing when the spring is fully expanded and in which the ratio of the volume of said second hydraulic chamber to the portion of the surface thereof exposed outside said casing is less when the die spring is fully contracted than when it is fully expanded.

References Cited

UNITED STATES PATENTS

| | | | |
|---|---|---|---|
| 2,559,967 | 7/1951 | Katz | 267—64 |
| 1,918,698 | 7/1933 | Gruss | 267—64 |
| 1,918,699 | 7/1933 | Gruss | 267—64 |

ARTHUR A. LA POINT, *Primary Examiner.*

R. M. WOHLFARTH, *Assistant Examiner.*